April 12, 1932.     J. C. CROWLEY     1,853,723
AIR CHUCK
Filed Aug. 12, 1927
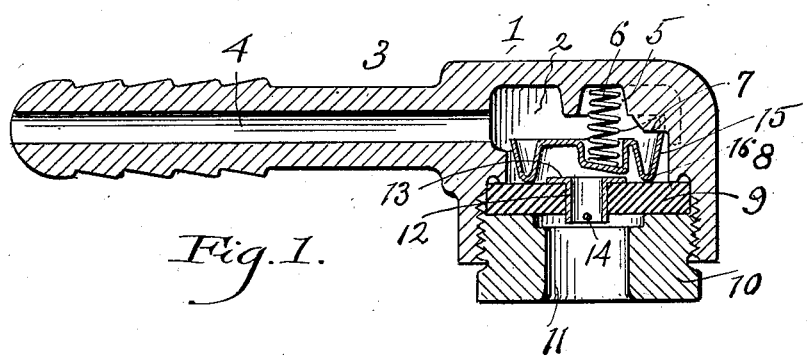
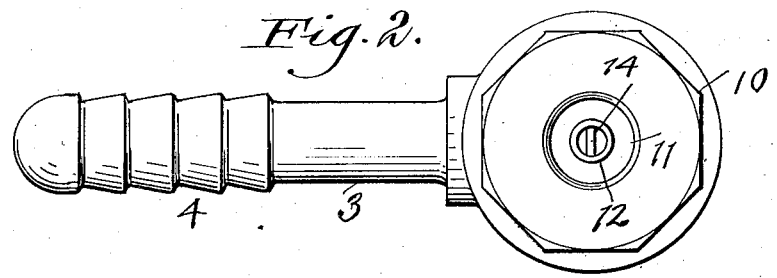
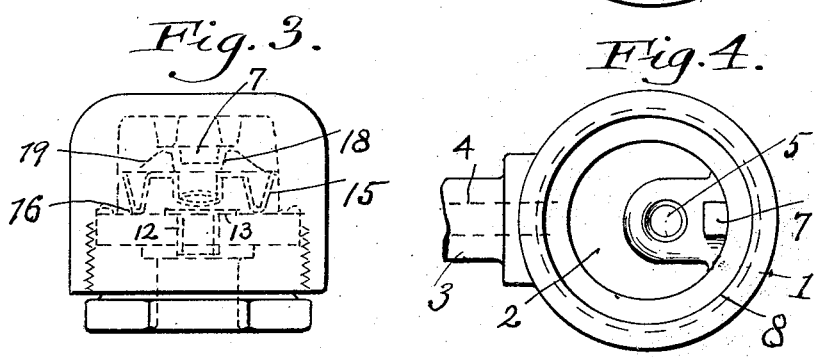
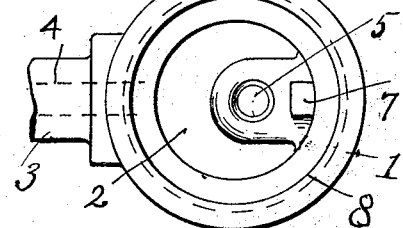
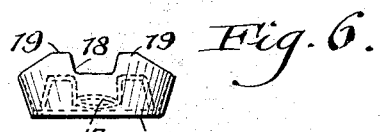
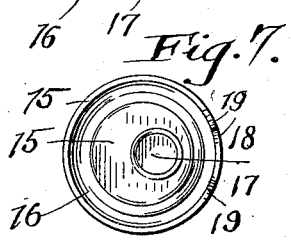
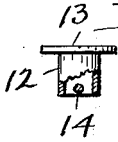
Inventor
John C. Crowley
By Kwon Hudson & Kent
Attorney Patented Apr. 12, 1932

1,853,723

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR CHUCK

Application filed August 12, 1927. Serial No. 212,423.

This invention relates to an air chuck which is customarily used in connection with an air hose for inflating a rubber article, such for instance as tires.

These air chucks are very commonly employed in connection with systems under pressure in garages and similar places, where they are conveniently disposed for users to apply them directly to the valve stems of tires.

Chucks of this kind being subject to considerable rough usage, therefore, must be stoutly built, and in addition the valve which is used in connection with the chuck must be of such nature as to firmly seat itself after use in order to prevent the escape of air. Conversely it is also necessary that the valve should be easily moved from its seat when application of the chuck is made to a valve stem. It is the object of the present invention to provide a chuck fulfilling these desired characteristics.

Reference should be had to the accompanying drawings forming a part of this specification, in which Figure 1 is a sectional elevation of an air chuck.

Figure 2 is a bottom plan view.

Figure 3 is an end elevation with certain of the mechanism shown in dotted lines.

Figure 4 is a bottom plan view of a portion of the chuck with the removable parts removed.

Figure 5 is a sectional elevation of the valve proper.

Figure 6 is an end elevation of the valve proper.

Figure 7 is a top plan view of the valve.

Figure 8 is an elevation with portions in section, of a part of the chuck mechanism.

The chuck comprises a head 1, having a recess 2 therein and an extending shank 3, which is bored, as indicated at 4, the bore of the shank communicating with the chamber 2. The shank 3 receives the hose which communicates with the air system under pressure. The chamber 2 has a cup shaped depression 5 which is adapted to receive a spring 6, to which reference will later be made. The wall of this chamber also has an extending lug 7, which cooperates with the movable valve member as will later be described.

Extending inwardly from the wall of the chamber 2 is an annular portion 8 against which there seats a packing washer 9. This packing washer is held in its place by means of a threaded member 10 which has a threaded engagement with the head 1. The member 10 has a central opening 11 and the member 9 has a central opening through which extends a member 12 which has a flange 13 that rests against the upper portion of the member 9. The depending skirt portion of the member 12 extends below the member 9, and this member may be provided with a transversely extending bar or pin 14. Within the chamber 2 there is a valve member which is generally represented at 15. This valve member is provided with an annular seat portion, as indicated at 16, which is adapted to rest upon the member 9. This whole valve member is preferably made as a stamping from a sheet of metal, and the seating portion 16 is brought to an approximate edge thereby to form a better air retaining engagement with the member 9. The valve 15 is provided with a depressed portion 17 which is slightly eccentric with respect to the axis of the valve 15 and is adapted to receive the end of the spring 6. Reference has before been made to the fact that the spring 6 cooperates with the recess 5 in the head 1.

The valve also has at the rear portion thereof a notch 18, with shoulders 19 which are adjacent thereto. The notch 18 is adapted to cooperate with the lug or extension 7, to which reference has before been made, with the shoulders 19 engaging with the portions of the head 1 which are on opposite sides of the extension 7. This arrangement forms a loose hinge or pivotal mounting for the valve 15, so that when the same is raised the action will be a pivotal action rather than a direct lifting action. This provides a more sensitive valve than a directly lifted valve, both for opening and closing.

The member 12 is positioned so that when the chuck is applied to the end of a valve stem, the valve stem will contact with the member 12 moving it into contact with the valve 15 thus displacing the valve from its seat. Immediately the pressure upon both sides of the valve equalizes itself so that it is unnecessary to hold the valve open against the action of the spring 6 which, as before stated, is a light spring.

The whole structure of the chuck is rugged, at the same time it is sufficiently sensitive to be easily operable and provides a secure retention for the valve to prevent leakage of air when the chuck is not in use.

Although a preferred embodiment of the invention has been disclosed and described herein, it should be understood that the invention is not to be limited thereto except insofar as the scope of the appended claims so limits it.

Having thus described my invention, I claim:

1. An air chuck comprising a member having a chambered head and an air inlet passage to said chamber, said chambered head having an opening, means forming a closure with a restricted opening, a valve member cooperating with said closure means and controlling the passage of air through said opening therein, said valve having a recess with shoulders upon the opposite sides of said recess and the wall of said chambered head being formed with a projection adapted to engage said recess in the valve, a spring member cooperating with the said valve to normally urge it toward closed position, and means associated with the said closure member for unseating the valve when said means is moved.

2. An air chuck comprising a member having a chambered head and an air inlet passage to said chamber, said chambered head having an opening, means forming a closure with a restricted opening, a valve member cooperating with said closure means and controlling the passage of air through said opening therein, interengaging formations upon the valve and wall of said chamber to provide a loose pivotal mounting for the valve, said valve being provided with a cuplike depression, a spring cooperating with said depression and also cooperating with a depression formed in the wall of the chamber.

3. An air chuck comprising a member having a chambered head and an air inlet passage to said chamber, said chambered head having an opening, means forming a closure with a restricted opening, a valve member cooperating with said closure means and controlling the passage of air through said opening therein, said valve member comprising a body portion formed with an annular V-shaped edge which engages with the closure member aforesaid and having an annular upwardly extending flange, said flange at a portion thereof being provided with a recess with shoulders upon opposite sides of the recess, said valve also being provided with a cup-shaped depression the center of which is at one side of the center of the valve, the wall of the chambered head being provided with a projection which is adapted to engage with the recess formed in the valve to thereby provide a loose pivotal mounting for the valve, a spring having one end thereof seated in the depression formed in the valve and its other end cooperating with the chambered member to normally urge the valve to closed position, and a movable member associated with the closure means for the chambered head and adapted to unseat the valve when the same is moved.

In testimony whereof, I hereunto affix my signature.

JOHN C. CROWLEY.